United States Patent [19]
Houji

[11] Patent Number: 5,832,197
[45] Date of Patent: Nov. 3, 1998

[54] ALTERNATE ROUTING BY INCREASING INITIALLY LOW QOS VALUE OF A SELECTED ALTERNATE PATH DURING FAILURE TO USER-SPECIFIED VALUE

[75] Inventor: Tomonari Houji, Tokyo, Japan

[73] Assignee: NEC Corporation, Tokyo, Japan

[21] Appl. No.: 760,261

[22] Filed: Dec. 5, 1996

[30]     Foreign Application Priority Data

Dec. 6, 1995   [JP]   Japan .................................... 7-316994

[51] Int. Cl.⁶ .................................................. G06F 11/00
[52] U.S. Cl. ................................ 395/182.02; 395/183.19; 395/200.69
[58] Field of Search ......................... 395/182.02, 182.09, 395/183.19, 185.09, 200.68, 200.69, 200.7, 200.71, 187.09, 182.08; 370/216, 222, 225, 444, 431

[56]                     References Cited

U.S. PATENT DOCUMENTS

| | | | |
|---|---|---|---|
| 4,365,247 | 12/1982 | Bargeton et al. .................. | 340/825.01 |
| 5,031,093 | 7/1991 | Hasegawa .................................. | 370/16 |
| 5,065,399 | 11/1991 | Hasegawa et al. ................ | 395/182.02 |
| 5,081,624 | 1/1992 | Beukema .......................... | 395/182.02 |
| 5,093,824 | 3/1992 | Coan et al. ........................ | 395/182.02 |
| 5,218,676 | 6/1993 | Ben-Ayed et al. ..................... | 395/200 |
| 5,321,815 | 6/1994 | Bartolanzo, Jr. et al. .............. | 395/200 |
| 5,402,478 | 3/1995 | Hluchyj et al. .......................... | 379/221 |
| 5,444,693 | 8/1995 | Arlsan et al. .............................. | 370/16 |
| 5,446,730 | 8/1995 | Lee et al. .................................. | 370/54 |
| 5,461,611 | 10/1995 | Drake, Jr. et al. ........................ | 370/54 |
| 5,649,108 | 7/1997 | Spiegel et al. ..................... | 395/200.12 |
| 5,674,003 | 10/1997 | Anderson et al. ................... | 364/514 R |
| 5,687,167 | 11/1997 | Bertin et al. .............................. | 370/254 |

FOREIGN PATENT DOCUMENTS

| | | | |
|---|---|---|---|
| 5160851 | 6/1993 | Japan ............................. | H09L 12/48 |

OTHER PUBLICATIONS

Lee et al., "Routing Subject to Quality of Service Constraints in Integrated Communications Networks", IEEE Network, vol. 9, iss. 4, pp. 46–55, Jul. 1995.

Lee et al., "Rule Based Call by Call Source Routing for Integrated Communication Networks", Infocom, IEEE, pp. 987–993, 1993.

Jordan et al., "Routing Algorithms in ATM Networks", UK Teletraffic Symposium, IEEE, pp. 4/1–4/7, 1994.

*Primary Examiner*—Joseph Palys
*Attorney, Agent, or Firm*—Sughrue, Mion, Zinn, Macpeak & Seas, PLLC

[57]                ABSTRACT

In a connection-oriented network, a source network node responds to a connection request from a source user by sending signaling messages to adjacent nodes to request reservation of multiple paths by specifying a QOS parameter of minimum level and then establishes to a destination node if the requests are accepted. The source network node selects one of the established paths and sends a second signaling message to the node of the selected path, requesting that the QOS parameter of the selected path be increased from the minimum level to a level specified by the connection request, and establishes a connection from the source user to a destination user via the selected path if the second signaling message is accepted by the node of the selected path. If a link failure occurs in the selected path, a protection switching routine is performed by the source node by selecting one of the paths available and sending a third signaling message to the node of the selected path, requesting an increase of the QOS parameter of the selected path to the user-specified level. If the third signaling message is accepted, the source node reestablishes the connection via the selected path. When the failed path is restored, a fault recovery routine begins by sending a fourth signaling message from the source node to the node of the restored path, requesting reservation of the restored path by specifying the QOS parameter of the minimum level. If the fourth signaling message is accepted, the restored path is reestablished. If a session is not restarted between the source and destination users, the protection switching is repeated.

11 Claims, 4 Drawing Sheets

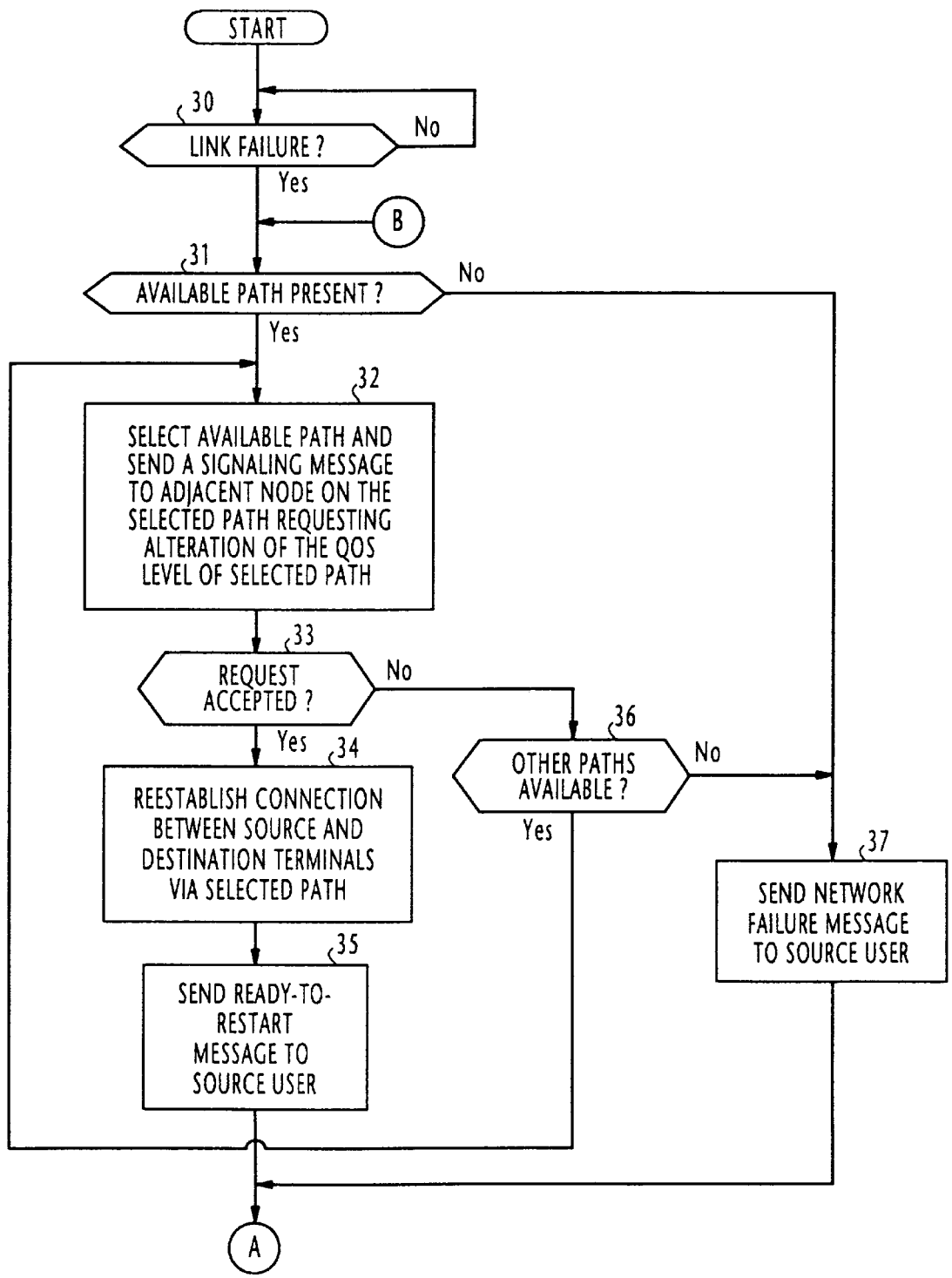

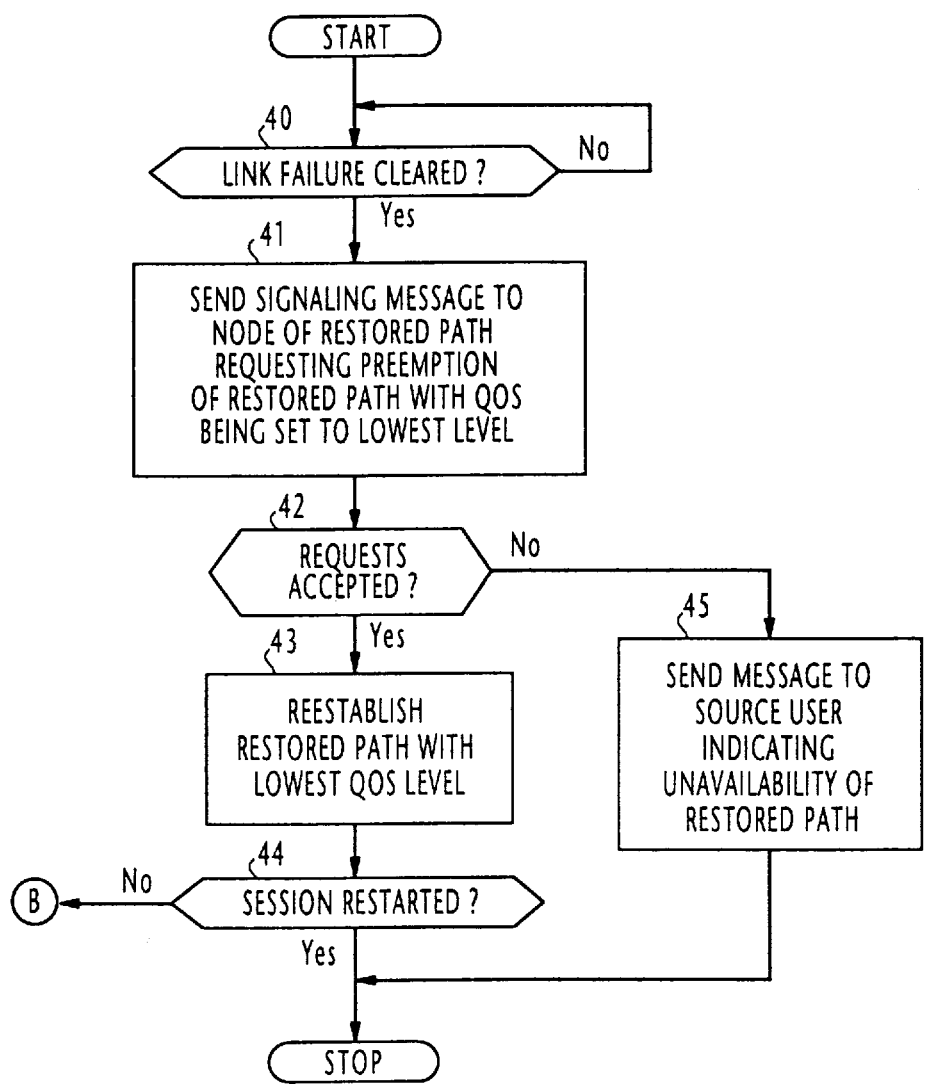

ALTERNATE ROUTING BY INCREASING INITIALLY LOW QOS VALUE OF A SELECTED ALTERNATE PATH DURING FAILURE TO USER-SPECIFIED VALUE

BACKGROUND OF THE INVENTION

1. Field of the Invention

The present invention relates to an alternate routing method for a connection-oriented network such as ATM (asynchronous transfer mode) network.

2. Description of the Related Art

According to the prior art alternate routing technique, as disclosed in Japanese Laid-Open Patent Specification Hei-5-160851, a working virtual path and multiple alternate virtual paths are established through a connection-oriented network in response to a connection request from a source user according to the QOS (quality of service) constraints of the transmission mediums used and to the attribute of the user terminal specified by the request. A connection is then established over the working path. The alternate virtual paths are preassigned particular priorities. Each network node along the working path monitors the user's traffic, and when a congestion occurs, selects one of the alternate virtual paths according to their priorities and switches the route to the selected virtual path without interrupting the connection. While this approach is advantageous due to its ability to perform alternate routing without interrupting a connection, the disadvantage is that a significant amount of network resource must be reserved for each connection.

SUMMARY OF THE INVENTION

It is therefore an object of the present invention to provide an alternate routing method which does not require a significant amount of network resource for reserving multiple alternate paths.

According to one aspect, the present invention provides a connection establishment method for alternate routing in a connection-oriented network in which a plurality of nodes are interconnected by communication links. The method comprises the steps of (a) responding to a connection request from a source user terminal for sending signaling messages from a source node to adjacent nodes to request reservation of multiple paths by specifying a QOS (quality of service) parameter of first level, (b) establishing the multiple paths of the QOS parameter of the first level from the source node to a destination node, (c) selecting one of the established paths and sending a signaling message from the source node to the node of the selected path, requesting that the QOS parameter of the selected path be increased from the first level to a level specified by the connection request, and (d) establishing a connection from the source user terminal to a destination user terminal via the selected path if the signaling message of step (c) is accepted by the node of the selected path.

According to a second aspect, the present invention provides an alternate routing method for a connection-oriented network in which a plurality of nodes are interconnected by communication links, wherein the method comprises the steps of:

a) responsive to a connection request from a source user terminal, sending signaling messages from a source node to adjacent nodes, requesting reservation of multiple paths by specifying a QOS (quality of service) parameter of first level;

b) establishing the multiple paths of the QOS parameter of the first level from the source node to a destination node;

c) selecting one of the established paths and sending a signaling message from the source node to the node of the selected path, requesting that the QOS parameter of the selected path be increased from the first level to a level specified by the connection request; and d) if the signaling message of step (c) is accepted by the node of the selected path, establishing a connection from the source user terminal to a destination user terminal via the path selected by step (c);

e) selecting one of the established paths which are not selected by step (c) if the path selected by step (c) has failed and sending a signaling message from the source node to the node of the selected path, requesting that the QOS parameter of the selected path be increased from the first level to the level specified by the connection request; and f) if the signaling message of step (e) is accepted by the node of the selected path, reestablishing the connection via the path selected by step (e).

Preferably, if the failed path is restored, a signaling message is transmitted from the source node to the node of the restored path, requesting reservation of the restored path by specifying the QOS parameter of the first level, and if the signaling message is accepted by the node of the restored path the restored path is established from the source node to the destination node. In addition, if a session is not restarted between the source and destination user terminals following the recovery of a failed path, steps (e) and (f) are repeated. Preferably, the first level of the QOS parameter corresponds to a minimum level of the QOS parameter.

BRIEF DESCRIPTION OF THE DRAWINGS

The present invention will be described in further detail with reference to the accompanying drawings, in which:

FIG. 3A is a flowchart illustrating a protection switching routine of the network node; and FIG. 3B is a flowchart illustrating a faulty recovery routine of the network node.

DETAILED DESCRIPTION

Figure 1:
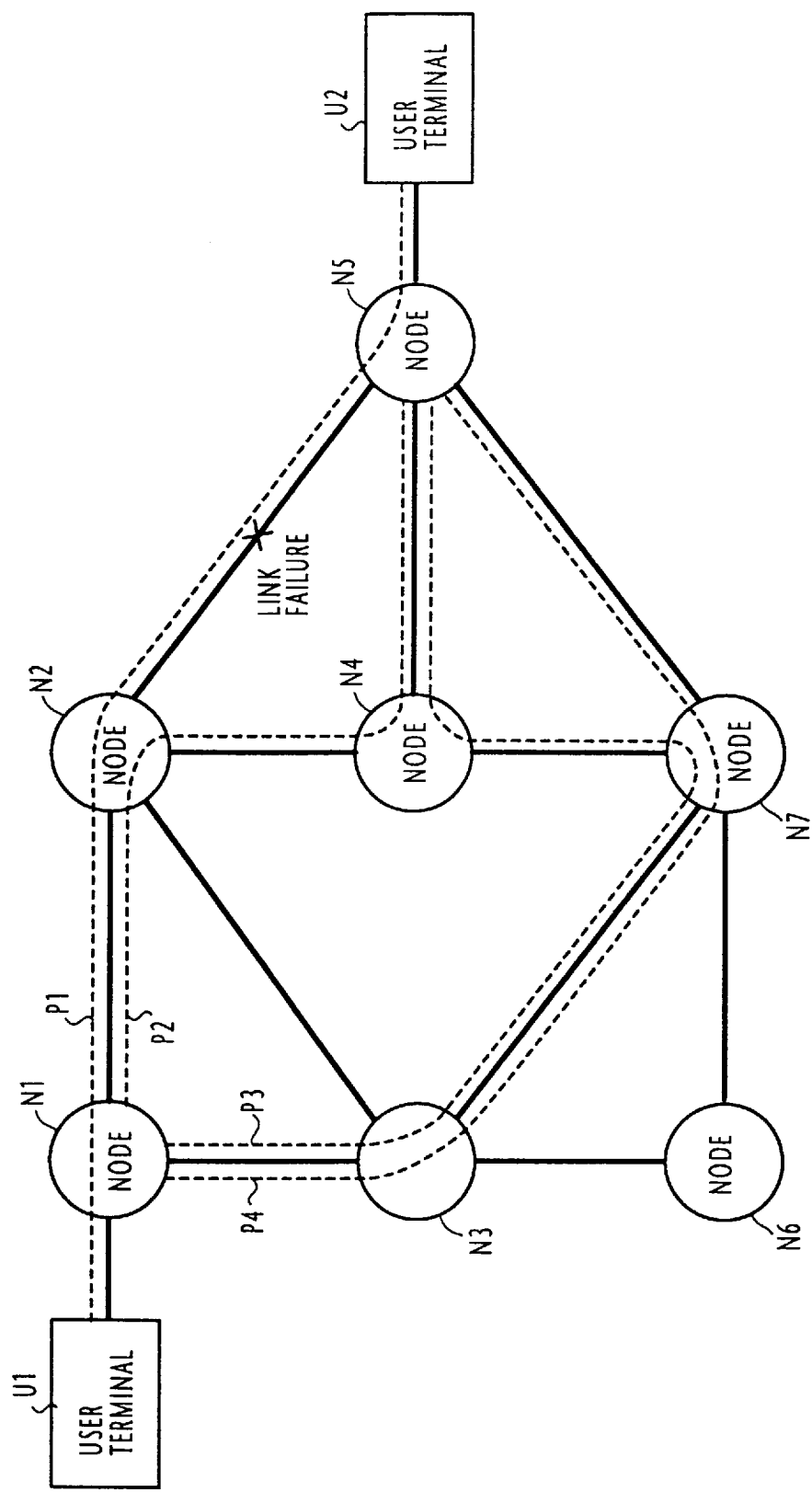
FIG. 1 is a block diagram of an ATM network embodying the present invention.

In FIG. 1, there is shown a typical connection-oriented network in which a plurality of ATM (asynchronous transfer mode) nodes N1 through N7 of this invention are interconnected by communication links. As an example, user terminals U1 and U2 are connected respectively to nodes N1 and N5.

Figure 2:
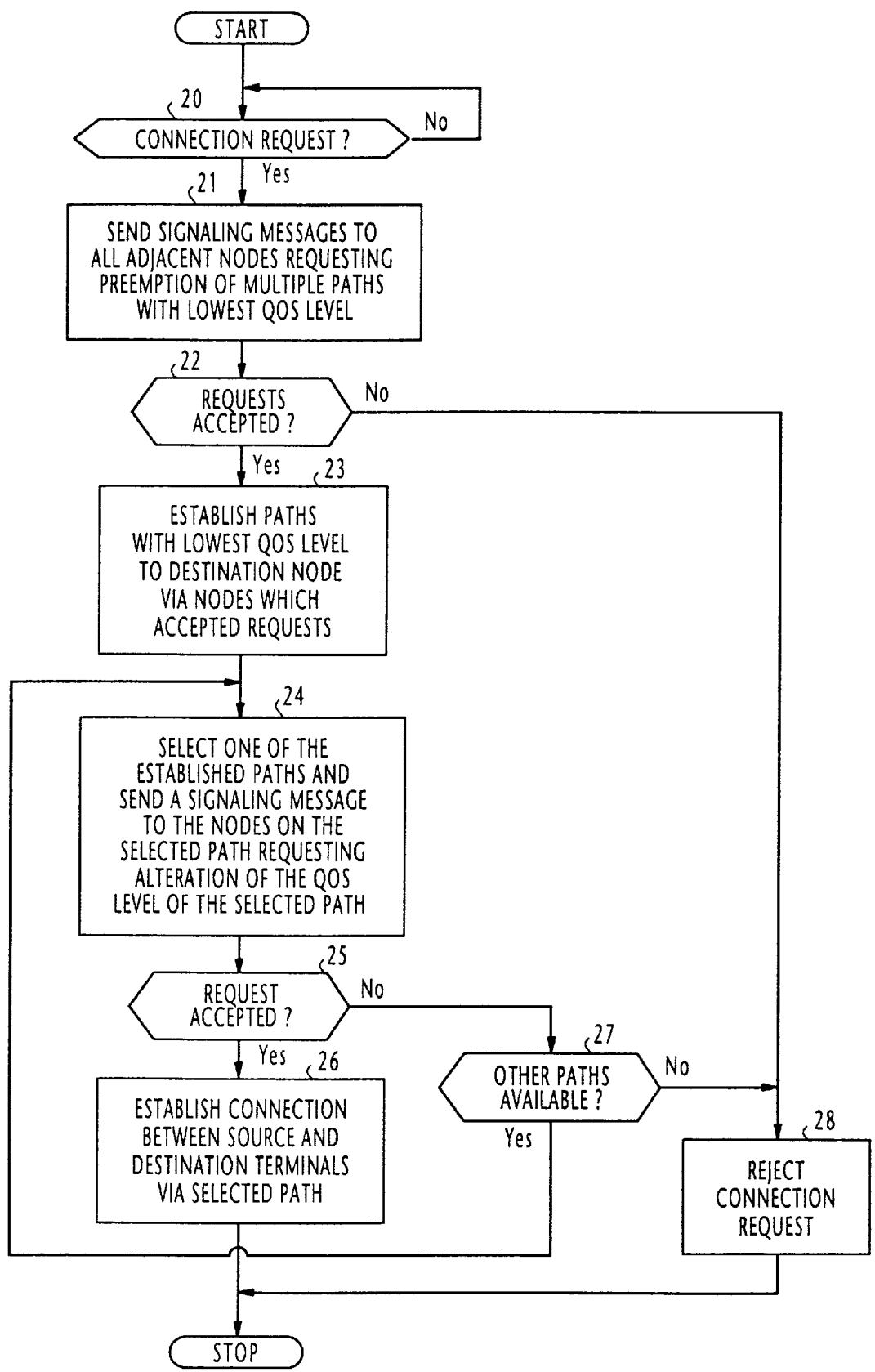
FIG. 2 is a flowchart illustrating a connection establishment routine of each node of the network.

The operation of ATM node N1, for example, will be explained with reference to the flowchart of FIG. 2 by assuming that user terminal U1 wishes to establish a connection to user terminal U2. In FIG. 2, node N1 begins a connection establishment routine, at step 20, in response to a connection request from the source terminal U1 by sending signaling messages to adjacent nodes N2 and N3 (step 21). The connection request specifies a desired value of one of QOS (quality of service) parameters such as available cell rate, cell delay time and cell loss rate. Each of these signaling messages requests multiple paths from source node N1 to destination node N5 via intermediate nodes N2, N3, N4 and N7 with the user's specified QOS parameter set to lowest level.

In the illustrated example, there are four available paths P1 to P4 that can be used to reach from node N1 to node N5, with P1 extending through node N2, P2 through nodes N2 and N4, P3 through nodes N3, N7 and N4, and P4 through nodes N3 and N7. In addition, each signaling message contains an indication that the QOS parameter of each possible path is of the lowest value. Although multiple paths are reserved for a single connection request, the network resource occupied by the source user U1 is kept small because of the minimum QOS value of the reserved paths.

At step 22, node N1 determines whether acknowledgment messages are received from the network. If such acknowledgment messages are received, it is determined that the requests from node N1 are accepted by intermediate nodes N2, N3, N4 and N7, and flow proceeds from step 22 to step 23 where node N1 establishes paths P1 to P4 of the minimum QOS value to the destination node N5.

At step 24, source node N1 selects one of the established paths, and sends a signaling message to one of more nodes located on the selected path in order to request that the QOS parameter of the selected path be increased from the minimum value to the user-specified value. If path P1 is selected, the signaling message will be sent to node N2. Flow proceeds to step 25 to determine whether the request from node N1 is accepted by node N2. If it is, flow proceeds from step 25 to step 26 to establish a connection between source user terminal U1 and destination user terminal U2 via the selected path P1, and terminate the connection establishment routine.

If the QOS-alteration request from node N1 is rejected by node N2 on the selected path, the decision is negative at step 25 and flow proceeds to step 27 to determine whether there are other reserved paths. If so, flow returns from step 27 to step 24 to repeat the selecting of another established path and the sending of a signaling message to the node on the selected path to request the alteration of the QOS value of the selected path to the user-specified value.

If no other paths are available, the decision at step 27 is negative and flow proceeds to step 28 to reject the connection request from terminal U2, terminating the connection establishment routine. Rejection step 28 is also executed when the initial requests are rejected and decision at step 22 is negative.

It is seen therefore that when a session begins on the connection established between terminals U1 and U2 over the path P1, other paths P2 to P4 are not used for communication, but reserved as spare paths for use in the event of a link failure which may occur along the path P1. As described before, because of the minimum QOS value with which paths P2 to P4 are reserved, the network resource is not wasted appreciably.

FIG. 3A illustrates a protection switching routine. It begins at step 30 if a link failure occurs in the working path. The following description will proceed by assuming that working path P1 has failed on the link between nodes N2 and N5 as indicated by a symbol "x" in FIG. 1. Flow proceeds to step 31 to check to see if the reserved paths P2 to P4 are normal and available for use. This is done by sending confirmation messages from node N1 to adjacent nodes N2 and N3. If acknowledgment messages are returned from these nodes, any of these reserved paths can be used instead of the faulty path P1. If such acknowledgment messages are received, the decision at step 31 is affirmative and flow proceeds to step 32 to select one of the available paths and send a signaling message to the adjacent node on the selected path requesting the alteration of its QOS parameter from the minimum value to the user-specified value. If the request is accepted (step 33), flow proceeds to step 34 to reestablish the connection between user terminals U1 and U2 via the newly selected path, and flow proceeds to step 35 to send a ready-to-restart message to source user terminal U1.

If the QOS-alteration request from node N1 is rejected by node N2 on the selected path, flow proceeds from step 33 to step 36 to determine whether there are other reserved paths. If so, flow returns from step 36 to step 32 to repeat the selecting of another established path and the sending of a signaling message to the node on the selected path to request the alteration of its QOS value to the user-specified value. If no other paths are available, the decision at step 36 is negative and flow proceeds to step 37 to send a network failure message to source terminal U1, terminating the protection switching routine. Step 37 is also executed when decision at step 31 is negative.

FIG. 3B illustrates a fault recovery routine. When a link failure is cleared (step 40), flow proceeds to step 41 to send a signaling message to the node of the restored path, requesting reservation of the restored path again with the minimum QOS value. Flow proceeds to step 42 to check to see if the request is accepted. If this is the case, flow advances to step 43 to reestablish the restored path with the minimum QOS level to the destination node N5, and proceeds to step 44 to check to see if the session between the terminals U1 and U2 is already restarted. If so, flow proceeds to the end of the routine. If all the established paths have failed or the previous protection switching routine results in a failure to restore the session, the decision at step 44 is negative. In such instances, flow returns to step 31 (FIG. 3A) to perform the protection switching routine on the restored path to restore the session. In this way, protection switching and fault recovery routines are repeatedly performed until the session can be restarted. If the request is not accepted (step 42), flow proceeds to step 45 to send a message to the source user terminal U1 indicating that the restored path is not available and proceeds to the end of the routine.

The protection switching and faulty recovery routines of the present invention are particularly useful for applications where the paths established between source and destination nodes are used on a continued basis as dedicated circuits.

What is claimed is:

1. A connection establishment method for alternate routing in a connection-oriented network in which a plurality of nodes are interconnected by communication links, the method comprising:

a) responsive to a connection request from a source user terminal, sending signaling messages from a source node to adjacent nodes, requesting reservation of multiple paths by specifying a QOS (quality of service) parameter of a first level;

b) responsive to said requesting reservation of multiple paths in a), establishing said multiple paths from said source node to a destination node, wherein said multiple paths are established according to the first level of the QOS parameter;

c) selecting one of the established paths and sending a signaling message from the source node to a node of the selected path, requesting that the QOS parameter of the selected path be increased from the first level to a level specified by the connection request; and d) if the signaling message of (c) is accepted by the node of the selected path, establishing a connection from the source user terminal to a destination user terminal via the selected path.

2. A connection establishment method as claimed in claim 1, wherein said first level of the QOS parameter corresponds to a minimum level of the QOS parameter.

3. A connection establishment method as claimed in claim 1, wherein (d) further comprises repeating (c) if the signaling message of (c) is not accepted by the node of the selected path.

4. An alternate routing method for a connection-oriented network in which a plurality of nodes are interconnected by communication links, the method comprising:
   a) responsive to a connection request from a source user terminal, sending signaling messages from a source node to adjacent nodes, requesting reservation of multiple paths by specifying a QOS (quality of service) parameter of a first level;
   b) responsive to said requesting reservation of multiple paths in a), establishing said multiple paths from said source node to a destination node, wherein said multiple paths are established according to the first level of the QOS parameter;
   c) selecting one of the established paths and sending a signaling message from the source node to a node of the selected path, requesting that the QOS parameter of the selected path be increased from the first level to a level specified by the connection request;
   d) if the signaling message of (c) is accepted by the node of the selected path, establishing a connection from the source user terminal to a destination user terminal via the path selected in (c);
   e) upon the selected path failing, selecting another one of the established paths which is available and sending a signaling message from the source node to a node of the other selected path, requesting that the QOS parameter of the other selected path be increased from the first level to the level specified by the connection request; and
   f) if the signaling message of (e) is accepted by the node of the other selected path, reestablishing said connection via the other path selected in (e).

5. An alternate routing method as claimed in claim 4, wherein said first level of the QOS parameter corresponds to a minimum level of the QOS parameter.

6. An alternate routing method as claimed in claim 4, wherein (d) further comprises repeating (c) if the signaling message of (c) is not accepted by the node of the selected path.

7. An alternate routing method as claimed in claim 4, wherein (f) further comprises repeating (e) if the signaling message of (e) is not accepted by the node of the other selected path.

8. An alternate routing method as claimed in claim 4, further comprising:
   g) if the failed path is restored, sending a signaling message from the source node to a node of the restored path, requesting reservation of the restored path by specifying said QOS parameter of the first level; and
   h) if the signaling message of (g) is accepted by the node of the restored path, establishing the restored path from said source node to said destination node.

9. An alternate routing method as claimed in claim 8, further comprising:
   i) if a session is not restarted between said source and destination user terminals following (h), repeating (e) and (f).

10. An connection establishment method as claimed in claim 1, wherein the first level of the QOS parameter is a lower level than the level of QOS parameter specified in the connection request.

11. An alternate routing method as claimed in claim 4, wherein the first level of the QOS parameter is a lower level than the level of QOS parameter specified in the connection request.

* * * * *